July 12, 1960  R. E. JOHNSON ET AL  2,945,079
GAS-ACTIVATED AND GAS-DEPOLARIZED DEFERRED ACTION CELL
Filed June 19, 1957
Fig. 1.
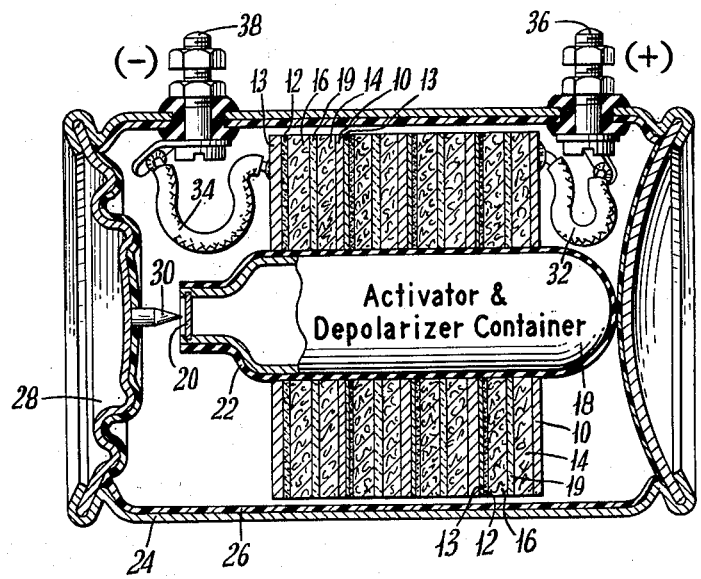
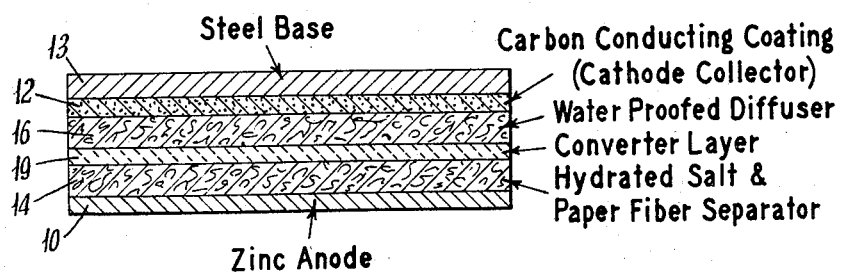
Fig. 2.
INVENTORS
RICHARD E. JOHNSON
NELSON C. CAHOON
HUGH F. SCHAEFER
BY
ATTORNEY

United States Patent Office 2,945,079
Patented July 12, 1960

2,945,079
GAS-ACTIVATED AND GAS-DEPOLARIZED DEFERRED ACTION CELL

Richard E. Johnson, Cleveland, Nelson C. Cahoon, Fairview Park, and Hugh F. Schaefer, Lakewood, Ohio, assignors to Union Carbide Corporation, a corporation of New York Filed June 19, 1957, Ser. No. 666,730

4 Claims. (Cl. 136—90)

This invention relates to chlorine-depolarized, deferred action cells wherein a gas is used to release water from hydrated inorganic salts to moisten an electrolyte-separator member and produce electrical energy.

The major problems encountered with gas-activated deferred action cells heretofore proposed are centered around the attainment of minimum cell thickness to provide the maximum possible energy density because of the need for a quantity of oxidic depolarizer, the rapid entry of activating gas without adversely affecting moisture retention, the prevention of conductive bridges, and the design of cell containers to permit efficient storage, retention, and release of the activating gases.

The main object of this invention is to provide a gas-depolarized, gas-activated deferred action battery system capable of instant activation at low temperatures, and capable of producing high currents quickly at low temperatures.

An important object of the invention is to provide a gas-depolarized deferred action cell wherein a gas is used to release water of hydration from hydrated salts incorporated in separator means.

These and other objects are achieved by the invention which will be described with reference to the accompanying drawing in which:

Fig. 1 is a vertical section of a battery of cells embodying the invention and housed in an enclosed container;

Fig. 2 is an enlarged vertical section of a portion of a cell embodying the invention of the type used in the battery of Fig. 1, showing in detail the novel separator disclosed herein.

The cell of the invention comprises a consumable metal anode; a gaseous depolarizer; an activating gas and depolarizing gas container, a separator adjacent to the anode and containing materials which react with activating gas to provide ionically conductive electrolyte, an electronically conductive converter which also functions as cathode current collector, and an electronically conductive electrolyte-non-wettable diffuser element adjacent to said cathode current collector and capable of providing a path for activating gas to said separator.

Referring particularly to Figs. 1 and 2 of the drawing, the cell of the invention may comprise a zinc anode 10 to one side of which may be applied a steel supporting member 13 coated with a conductive layer of carbon 12 to serve as the cathode collector. Adjacent to the other side of the zinc anode 10 is a dry separator 14. This separator contains hydrated salts hereinafter described with greater particularity. Adjacent to the separator 14 is a converter 19 in contact with a diffuser element 16 fabricated of conductive carbon coated paper or other conductive fibers. The cell is completed by the conducting carbon coating 12 applied to the surface of the steel base.

As indicated in Fig. 1, the cell elements just described may be annular. A number of cells, four being shown in that figure for purposes of illustration, are arranged in series contact to form a battery and a metal ampule 18 containing compressed activating gas and compressed depolarizing gas to be described hereinafter, and provided with a frangible diaphragm 20, is placed within the central aperture of the annular cell elements. The ampule 18 is provided with an insulating sheath 22 suitably of a corrosion-resisting plastic material. The battery and ampule 18 are arranged in a sealed container 24 of metal provided with a corrosion-resisting lining 26. One end cover 28 of the container 24 is provided with a piercing point 30 adapted to rupture the frangible disc 20 of the ampule 18 when it is desired to activate the battery. Appropriate positive 32 and negative 34 leads are provided from the battery to external terminals 36 and 38, respectively.

In the cell of the invention the anode may be formed of any of a number of metals. Among those which are satisfactory are aluminum, magnesium, cadmium, manganese and iron, in addition to zinc. Economic considerations make zinc the most desirable of these. Similarly, any of a number of depolarizing gases may be used. Halogens such as bromine, chlorine, and fluorine are conventional depolarizing gases. Of these, chlorine is preferred.

The novel separator utilized in the cell of the invention contains finely divided crystals of an inorganic hydrated salt combined with a sufficient amount of inert fibrous materials such as alpha cellulose flock, glass flock, polyethylene fibers or vinyl fibers to support the crystals and to permit handling. Typical inorganic salts include hydrated hydroxides of the alkali metals and alkaline earth metals such as $$LiOH \cdot H_2O, Ba(OH)_2 \cdot 8H_2O \text{ and } Sr(OH)_2 \cdot 8H_2O$$

Of these the octahydrate of strontium hydroxide $$(Sr(OH)_2 \cdot 8H_2O)$$

is preferred.

The separator is manufactured by conventional paper casting or paper calendering techniques. As an example of a preferred method of preparing the separator the following is given: 30 grams of crystalline $$Sr(OH)_2 \cdot 8H_2O$$

and 1 gram of glass fiber were ball milled with 200 cc. of a saturated aqueous solution of $Sr(OH)_2$. Ball milling was continued until the salt particles were reduced in size so as to pass a 200 mesh screen. When the mixture attained the indicated physical state, it was possible to cast it or to calender it using, for example, as desired, a Fourdrinier engine. The formed mass next was dried in an oven at about 65° C. to remove excess water and cause the salt to assume the hydration represented by the formula $Sr(OH)_2 \cdot 8H_2O$. The separator so produced contains about 90 percent by weight of hydrated salt.

The present cell is intended to be depolarized by a depolarizing gas such as chlorine placed in the activator-depolarizer ampule. The depolarizing gas is rendered active by a converter element such as activated carbon black. At low temperatures, where the vapor pressure of chlorine is not sufficient for good depolarization and high battery performance, heat supplied by the coordination reaction of $BF_3$ with the hydrated salt forming material of the separator increases the temperature of the system to such a level that the vapor pressure of chlorine is sufficient for high battery output. This is not the case for the ordinary chlorine depolarized cell, and is one of the important advantages of the present novel system.

In cells embodying the invention utilizing a dry separator and electrodes of the type described, the diffuser element may be composed of any convenient gas-permeable material such as a porous ceramic material, porous carbon material, fibrous paper or textile materials which will permit ready access of such gas to the separator and its contained electrolyte-forming material. This ready access of gas is maintained by water-proofing the diffuser element. The diffuser element must also be electronically conductive. For convenience and economy, ordinary blotting paper is satisfactory for use as a diffuser element when rendered conductive. A preferred diffuser is that described and claimed in the application of Carl A. Grulke, Serial No. 594,628, filed June 28, 1956, and now abandoned.

The diffuser element is placed in the cell adjacent to the converter, which in turn is in contact with the diffuser, and the cell is completed by placing a duplex electrode with its carbon cathode current collector surface adjacent to the other surface of the diffuser element.

The cell of the invention may be activated by lateral diffusion of activating gas from the depolarizing gas-containing reservoir 18 through the diffuser element. If desired, a separate container may be provided for the activating gas. In either case, the activating gas coordinates with the electrolyte-forming material to produce ionically conductive electrolyte. The activating gas reacts with the hydrating salt to release water of hydration therefrom, which reacts with additional boron trifluoride to form hydrogen fluoride and boric acid, hydrogen fluoride serving as electrolyte; or by forming fluoboric acid by reaction with the boric acid, in which case fluoboric acid serves as the electrolyte. During these reactions the separator element is wet by the released water of hydration. Reactions which are believed to summarize the phenomena which take place in the cell are set forth below:

$$3[Sr(OH)_2 \cdot 8H_2O] + 10BF_3$$
$$\rightarrow 3BaF_2 + 4H_3BO_4 + 6HBF_4 + 18H_2O$$

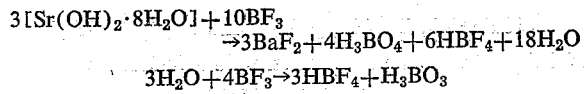

Suitable activating gases in addition to boron trifluoride are silicon tetrafluoride, hydrogen chloride and hydrogen fluoride. The cells of the invention may also be activated by using an excess of certain depolarizing gases, preferably chlorine. In this embodiment the amount of depolarizing gas placed in the ampule is increased over and above that needed for depolarizing purposes.

A cell of this type operates as follows: Activating gas ($BF_3$ or others) enters the porous dry separator and releases water of hydration from an electrolyte-former in the separator. The water and activating gas or salts of the separator combine to form an ionically conducting electrolyte which wets the surface of the electronically conductive converter layer, and the anode. Depolarizing gas (chlorine or others) enters the electronically conducting gas permeable diffuser, passes through the converter layer where it is converted into an active depolarizing gas and depolarizes the cell at the converter-electrolyte interface. A conducting carbon coating on the other side of the diffuser layer serves to complete the cell by collecting the electron current which has been passed to it by the conductive diffuser and converter. This conducting cathode collector may be conveniently mechanically supported by a steel base strip, which in turn may be contacting the anode layer of an adjacent cell in series connected battery stacks, or may be coated with a carbon cathode collecting layer of an adjacent parallel connected cell.

Conventional chlorine-depolarized cells normally use a wet electrolyte. As a result, the shelf life of such cells is unreliable, for the electrolyte dries out in a period of time, depending upon storage conditions. In addition, the water often migrates to unwanted places in the cell. Again the activation of such cells is slow and unreliable at low temperatures. By contrast in the cell of the invention, being activated by a gas has an indefinite shelf life, and temperatures of storage or of activation are not a factor.

Prior art gas activated cells so far have used oxidic depolarizers. By using gas depolarization, the cell of the invention furnishes a 100% higher current carrying capacity per unit volume than the former cells.

Cells made in accord with the present invention suitably have a thickness of around 35 to 40 thousandths of an inch per individual cell. Such cells deliver current drains in excess of 250 mils per inch square of electrode area. The voltage level under load varies with the load. The open circuit voltage is 1.9 to 2.1 volts. The activation time is about ¼ second at room temperature. The cells of the invention operate at —40° F.

What is claimed is:

1. A deferred action battery comprising a container and in said container a frangible ampule containing activating and depolarizing gases, means for fracturing said ampule, at least one cell unit comprising a metallic base and on said base a conductive carbon coating, an electronically conductive water-proofed diffuser adjacent said coating in contact therewith, an electronically conductive converter layer adjacent to said diffuser in contact therewith, a dry fibrous gas-permeable separator in contact with said converter layer, and consisting of finely divided crystals of an inorganic hydrated salt of a metal selected from the group consisting of the alkali metals and the alkaline earth metals, said crystals being supported by means of an inert fibrous material, said crystals providing water and electrolyte upon reaction with activating gas; and a consumable anode in contact with said separator.

2. A gas-depolarized, gas-activatable deferred action cell comprising a container, and in said container an anode of a consumable metal selected from the group consisting of zinc, nickel, cadmium, lead, aluminum, iron, manganese and magnesium, a frangible ampule containing a mixture of activating gas with depolarizing gas; a dry fibrous separator permeable to gas and containing hydrated material adapted to provide water and electrolyte upon reaction with said activating gas, and means providing access for said gas to said electrolyte-forming materials.

3. The cell of claim 2 wherein said depolarizing gas is selected from the group consisting of chlorine, bromine and fluorine, and said activating gas is selected from the group consisting of boron trifluoride, silicon tetrafluoride, hydrogen chloride and mixtures thereof.

4. The cell of claim 2 wherein said cell is depolarized by chlorine gas and activated by an excess of the same gas.

References Cited in the file of this patent

UNITED STATES PATENTS 2,615,931   Hatfield _____ Oct. 28, 1952
2,783,291   Gold _____ Feb. 26, 1957